US011953191B1

(12) United States Patent
Lam

(10) Patent No.: US 11,953,191 B1
(45) Date of Patent: Apr. 9, 2024

(54) WATER-PROOF DECORATIVE LAMP AND LAMP STRING

(71) Applicant: SEASON BRIGHT (CAMBODIA) ELECTRONIC LIGHTING CO., LTD., Bavet (KH)

(72) Inventor: Su Io Lam, Bavet (KH)

(73) Assignee: SEASON BRIGHT (CAMBODIA) ELECTRONIC LIGHTING CO., LTD., Bavet (KH)

( * ) Notice: Subject to any disclaimer, the term of this patent is extended or adjusted under 35 U.S.C. 154(b) by 0 days.

(21) Appl. No.: 18/150,276

(22) Filed: Jan. 5, 2023

(30) Foreign Application Priority Data

Sep. 29, 2022 (CN) ......................... 202222604416.7

(51) Int. Cl.
*F21V 31/00* (2006.01)
*F21V 15/01* (2006.01)
*F21V 23/06* (2006.01)

(52) U.S. Cl.
CPC ............ *F21V 31/005* (2013.01); *F21V 15/01* (2013.01); *F21V 23/06* (2013.01)

(58) Field of Classification Search
CPC ......... F21V 31/005; F21V 15/01; F21V 23/06
See application file for complete search history.

(56) References Cited

U.S. PATENT DOCUMENTS 5,829,865 A * 11/1998 Ahroni ...................... F21S 4/10 362/657
6,079,848 A * 6/2000 Ahroni ................... H01R 4/242 439/699.1
6,120,312 A * 9/2000 Shu ..................... F21V 19/0005 439/356
6,123,433 A * 9/2000 Chen .................... H01R 13/521 362/249.02
7,422,489 B1 * 9/2008 Tseng .................... F21V 21/002 439/699.2
7,453,194 B1 * 11/2008 Gibboney ................ H01K 1/46 313/318.09
7,575,362 B1 * 8/2009 Hsu ........................ H01R 33/09 362/652
7,871,301 B1 * 1/2011 Yang ...................... H01R 33/09 439/220

(Continued)

*Primary Examiner* — Tsion Tumebo
(74) *Attorney, Agent, or Firm* — Epstein Drangel LLP; Robert L. Epstein

(57) ABSTRACT

A water-proof decorative lamp and a lamp string are disclosed. The water-proof decorative lamp includes a light source body, connecting wires and a water-proof component. The water-proof component includes a light-emitting chip and a packaging body, the light-emitting chip is arranged in the packaging body and is provided with two pins extending out of the packaging body, the connecting wire includes a conductive wire and an insulating layer wrapping the conductive wire, the conductive wire protrudes out of the insulating layer to form a connector, and the two pins are respectively connected with the connectors. The water-proof component includes an isolating column between the two pins and a sleeve arranged around the insulating layer at one end, and the packaging body at the other end, the isolating column is made of a hot melting material, and the sleeve is made of a heat-shrinkable material.

6 Claims, 2 Drawing Sheets

(56) References Cited

U.S. PATENT DOCUMENTS

| | | | | |
|---|---|---|---|---|
| 7,893,627 | B2 * | 2/2011 | Li | F21S 4/10 315/185 S |
| 8,376,606 | B2 * | 2/2013 | Yu | F21V 31/005 362/652 |
| 8,920,002 | B2 * | 12/2014 | Chen | H01L 33/62 362/249.02 |
| 9,803,851 | B2 * | 10/2017 | Loomis | F21S 4/10 |
| 2009/0129099 | A1 * | 5/2009 | Fan | F21S 4/10 362/368 |
| 2013/0003390 | A1 * | 1/2013 | Wu | F21V 19/001 362/311.02 |
| 2013/0163250 | A1 * | 6/2013 | Chen | H01R 33/06 362/249.06 |
| 2015/0078000 | A1 * | 3/2015 | Chen | F21S 4/15 362/249.16 |
| 2017/0363273 | A1 * | 12/2017 | Chen | F21V 17/16 |
| 2021/0080087 | A1 * | 3/2021 | On | H01R 33/09 |
| 2021/0140623 | A1 * | 5/2021 | Yu | F21V 19/005 |

* cited by examiner

WATER-PROOF DECORATIVE LAMP AND LAMP STRING

CROSS-REFERENCE TO RELATED APPLICATION

This application is based on and claims the benefit of priority from Chinese Patent Application No. 2022226044167, filed on 29 Sep. 2022, the entirety of which is incorporated by reference herein.

TECHNICAL FIELD

The disclosure relates to the technical field of lamp strings, in particular to a water-proof decorative lamp and a lamp string.

BACKGROUND

A lamp string is generally composed of a plurality of decorative lamps in parallel or in series. At some occasions of festivals and events, such as at Christmas, Christmas trees are usually adopted and embellished in order to foil a festival atmosphere. Lamp strings are hung on the Christmas trees to enhance the ornamental value. As Christmas lamp strings are mostly used in outdoor environments, the Christmas lamp strings are required to have good water-proof performance. However, structural designs of the majority of lamp strings are unreasonable at present, and the lamp strings have poor water-proof performance.

SUMMARY

The disclosure aims at solving at least one of the technical problems in the existing technology. For this purpose, the disclosure provides a water-proof decorative lamp, which has a good water-proof effect and brings better usage experiences for users.

The disclosure further discloses a lamp string provided with the foregoing water-proof decorative lamps.

The water-proof decorative lamp according to an embodiment of a first aspect of the disclosure includes a light source body, connecting wires and a water-proof component. The water-proof component includes a light-emitting chip and a packaging body. The light-emitting chip is arranged in the packaging body and is provided with two pins extending out of the packaging body. The connecting wires each includes a conductive wire and an insulating layer. A side wall of the conductive wire is covered with the insulating layer. The conductive wire located at one end of the connecting wire protrudes out of the insulating layer to form a connector. The two pins are respectively connected with the connectors. The water-proof component includes an isolating column and a sleeve. The isolating column is disposed between the two pins so as to separate the two pins from each other and the two connectors from each other. One end of the sleeve is arranged around the insulating layer near the connector, and the other end of the sleeve is arranged around the packaging body near the pin to cover the connector and the pin. The isolating column is made of a hot melting material, and the sleeve is made of a heat-shrinkable material.

The water-proof decorative lamp according to the embodiment of the first aspect of the disclosure at least has the following beneficial effects. The isolating column is arranged between the two pins to prevent short circuit of the pins and the connectors. One end of the sleeve is arranged around the insulating layer near the connector, and the other end of the sleeve is arranged around the packaging body near the pin. When being heated, the isolating column is melted to wrap the pin and the connector. At the same time, the sleeve is tightened to tightly wrap the pins, the connectors and the isolating column between the packaging body and the insulating layer. In this way, the external rainwater is difficult to penetrate into contact with the pins and the connectors, so that the water-proof effect is good, and the structure is simple, which can lower the production cost.

According to some embodiments of the disclosure, the water-proof decorative lamp further includes a conductive terminal, a first clip is arranged at one end of the conductive terminal, a second clip is arranged at the other end of the conductive terminal, the first clip is roll-pressed on the pin, and the second clip is roll-pressed on the connector.

According to some embodiments of the disclosure, the conductive terminal is provided with a third clip, and the third clip is configured for roll-pressing on the insulating layer near the connector.

According to some embodiments of the disclosure, the water-proof decorative lamp further includes a resistor, the resistor is arranged between the pin and the connector, one end of the resistor is connected to the pin, and the other end of the resistor is connected to the connector.

According to some embodiments of the disclosure, at least one resistor is provided.

According to some embodiments of the disclosure, the water-proof decorative lamp further includes a lamp holder and a light transmitting cover, the lamp holder is provided with an installing channel with an opening, the light source body is arranged in the installing channel, a notch for passing the connecting wire is arranged on a bottom wall of the installing channel, the light transmitting cover is snap-fitted with the lamp holder, and the light transmitting cover is configured for covering the installing channel.

According to some embodiments of the disclosure, an umbrella-shaped shielding part is arranged at one end of the cover near the lamp holder for covering a gap between the cover and the lamp holder.

According to some embodiments of the disclosure, the water-proof decorative lamp further includes a positioning block which is arranged at a bottom portion of the isolating column and is located between the connecting wires, positioning surfaces located in the installing channel are provided at both sides of the lamp holder, and two sides of the positioning block are abutted against the positioning surfaces respectively.

A lamp string according to an embodiment of a second aspect of the disclosure includes a plurality of the water-proof decorative lamps according to the first aspect above and a cable, wherein the cable is electrically connected with the connecting wires and is provided with a power interface, and the power interface is configured for connecting to a driving power.

The lamp string according to the embodiment of the second aspect of the disclosure at least has the following beneficial effects. The water-proof decorative lamps can be connected via a cable in parallel or in series, so that the water-proof decorative lamps are disposed on a long object and are applicable to different occasions. Moreover, the cable itself has a good water-proof performance, so a good water-proof performance can be achieved after the cable is connected with the water-proof decorative lamps.

The additional aspects and advantages of the disclosure will be given in part in the following description, and will become apparent in part from the following description, or will be learned through the practice of the disclosure.

BRIEF DESCRIPTION OF THE DRAWINGS

The additional aspects and advantages of the disclosure will be more apparent from the following description of the embodiments in conjunction with the accompanying drawings, wherein.

REFERENCE NUMERALS

Figure 1:
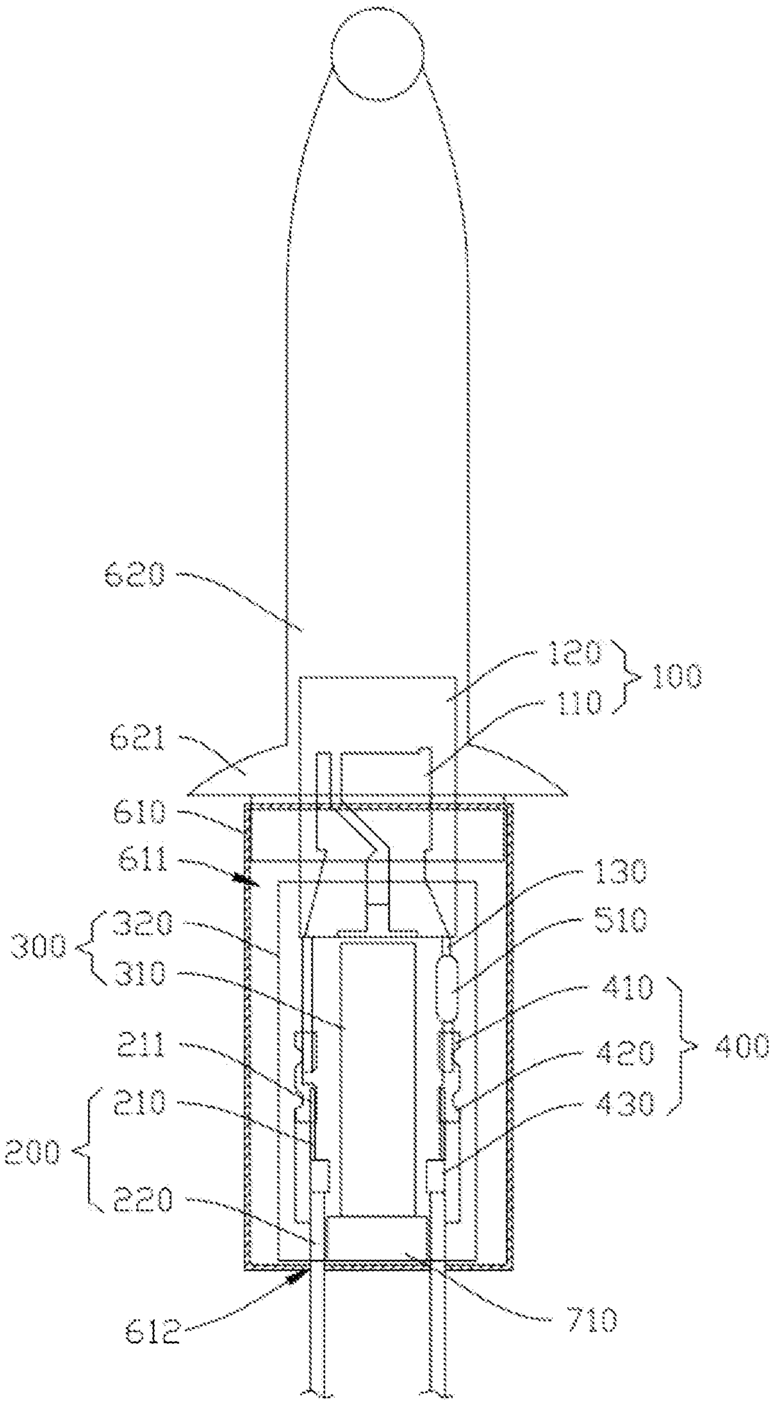
FIG. 1 is a structural schematic diagram of a water-proof decorative lamp in an embodiment of a first aspect of the disclosure.

- 100 refers to light source body, 110 refers to light-emitting chip, 120 refers to packaging body, and 130 refers to pin;
- 200 refers to connecting wire, 210 refers to conductive wire, 211 refers to connector, and 220 refers to insulating layer;
- 300 refers to water-proof component, 310 refers to isolating column, and 320 refers to sleeve;
- 400 refers to conductive terminal, 410 refers to first clip, 420 refers to second clip, and 430 refers to third clip;
- 510 refers to resistor;
- 610 refers to lamp holder, 611 refers to installing channel, 612 refers to notch, 620 refers to light transmitting cover, 621 refers to shielding part;
- 710 refers to positioning block; and
- 800 refers to cable, 810 refers to power interface, and 820 refers to connector.

DETAILED DESCRIPTION

The embodiments of the disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the disclosure, but should not be construed as limiting the disclosure.

In the description of the disclosure, it should be understood that the positional descriptions referred to, for example, the directional or positional relationships indicated by up, down, front, rear, left, right, etc., are based on the directional or positional relationships shown in the drawings, and are only for convenience and simplification of description of the disclosure, but not for indicating or implying that the referred device or element must have a specific direction, be constructed and operated in a specific direction, and thus should not be construed as limiting the disclosure.

In the description of the disclosure, "first" and "second" if described are only used to distinguish between technical features but cannot be used to indicate or imply relative importance or implicitly specify a quantity of indicated technical features or implicitly specify a sequential relationship of indicated technical features.

In the description of the disclosure, unless otherwise expressly defined, the terms such as "disposed", "mounted", and "connected" should be understood in a broad sense. For persons of ordinary skill in the art, specific meanings of the terms in the disclosure may be appropriately determined with reference to the specific content in the technical solution.

Referring to FIG. 1, a water-proof decorative lamp provided in an embodiment of a first aspect of the disclosure includes a light source body 100, including a light-emitting chip 110 and a packaging body 120, wherein the light-emitting chip 110 is arranged in the packaging body 120 and is provided with two pins 130 extending out of the packaging body 120; connecting wires 200, each including a conductive wire 210 and an insulating layer 220, wherein a side wall of the conductive wire 210 is covered with the insulating layer 220, the conductive wire 210 located at one end of the connecting wire 200 protrudes out of the insulating layer 220 to form a connector 211, and the two pins 130 are respectively connected with the connectors 211; a water-proof component 300, including an isolating column 310 and a sleeve 320, wherein the isolating column 310 is disposed between the two pins 130 so as to separate the two pins 130 and the two connectors 211 from each other, one end of the sleeve 320 is arranged around the insulating layer 220 near the connector 211, and the other end thereof is arranged around the packaging body 120 near the pin 130 to cover the connector 211 and the pin 130, the isolating column 310 is made of a hot melting material, and the sleeve 320 is made of a heat-shrinkable material.

It should be noted that the isolating column 310 is made of the hot melting material, so that the isolating column 310 is melted when being heated and is re-solidified when being cooled, and the isolating column 310 has insulating property. The sleeve 320 is made of the heat-shrinkable material, so that the sleeve 320 will be shrunk when being heated.

Specifically, in the installing and manufacturing process, the isolating column 310 is arranged between the two pins 130 to prevent short circuit of the pins 130 and the connectors. One end of the sleeve 320 is arranged around the insulating layer 220 near the connector 211, and the other end of the sleeve 320 is arranged around the packaging body 120 near the pin 130. When being heated, the isolating column 310 is melted to wrap the pin 130 and the connector 211. At the same time, the sleeve 320 is tightened to tightly wrap the pins 130, the connectors and the isolating column 310 between the packaging body 120 and the insulating layer 220. In this way, the external rainwater is difficult to penetrate into contact with the pins 130 and the connectors, so that the water-proof effect is good, and the structure is simple, which can lower the production cost.

It should be understood that, referring to FIG. 1, the water-proof decorative lamp further includes a conductive terminal 400, a first clip 410 is arranged at one end of the conductive terminal 400, a second clip 420 is arranged at the other end of the conductive terminal 400, the first clip 410 is roll-pressed on the pin 130, and the second clip 420 is roll-pressed on the connector 211. It should be noted that the conductive terminal 400 is configured for quickly connecting the pin 130 with the connector 211. In addition, the conductive terminal 400 clasps the pin 130 and the connector 211 via the first clip 410 and the second clip 420, so as to enhance anti-pull capability.

It should be understood that, referring to FIG. 1, the conductive terminal 400 is provided with a third clip 430, which is configured for roll-pressing on the insulating layer 220 near the connector 211. It should be noted that the insulating layer 220 near the connector 211 is fixed by the third clip 430 in a fastening ring formed by the third clip 430 via a frictional force, thereby further enhancing the anti-pull capability and avoiding breakage due to a concentrated force at the connector 211 when pulling out. Therefore, the operational reliability is improved.

It should be understood that, referring to FIG. 1, the water-proof decorative lamp further includes a resistor 510. The resistor 510 is arranged between the pin 130 and the connector 211, one end of the resistor 510 is connected to the pin 130, and the other end of the resistor 510 is connected to the connector 211. It should be noted that the resistor 510 is connected with the light-emitting chip 110 in series to prevent the great change of the current in the circuit from burning down the light-emitting chip 110, thereby improving the safety and reliability of operation.

Those of ordinary skills in the art should understand that the resistor 510 and the pin 130 may be fixed by welding or by the conductive terminal 400. Similarly, the resistor 510 and the connector 211 may be fixed by welding or by the conductive terminal 400, which is not specifically limited herein.

It should be understood that, referring to FIG. 1, at least one resistor 510 is provided to ensure the stability of the current in the circuit.

Optionally, one resistor 510 may be arranged and connected to one of the pins 130. Alternatively, two resistors 510 may be arranged and connected to the two pins 130 respectively, or both connected to one pin 130. It just needs to ensure that there is at least one resistor 510 connected to the circuit, and the number and the connecting mode of the resistor 510 are not limited specifically.

It should be understood that, referring to FIG. 1, the water-proof decorative lamp further includes a lamp holder 610 and a light transmitting cover 620, the lamp holder 610 is provided with an installing channel 611 with an opening, the light source body 100 is arranged in the installing channel 611, a notch 612 for passing the connecting wire 200 is arranged on a bottom wall of the installing channel 611, the light transmitting cover 620 is snap-fitted with the lamp holder 610, and the light transmitting cover 620 is configured for covering the installing channel 611. It should be noted that the light source body 100 is arranged in the installing channel 611. The lamp holder 610 and the light transmitting cover 620 can not only play a role in protection and prevent the light source body and the water-proof component 300 from external mechanical damage to prolong the service life thereof, but also can play a certain water-proof role to improve the water-proof effect. In addition, the light transmitting cover 620 and the lamp holder 610 are connected in a snap-fit manner, which is beneficial to disassemble.

It should be understood that, referring to FIG. 1, an umbrella-shaped shielding part 621 is arranged at one end of the cover near the lamp holder 610 for covering a gap between the cover and the lamp holder 610, so as to prevent rainwater from penetrating into the installing channel 611 through the gap between the cover and the lamp holder 610, further improving the water-proof effect.

It should be understood that, referring to FIG. 1, the water-proof decorative lamp further includes a positioning block 710. The positioning block 710 is arranged at a bottom portion of the isolating column 310 and is located between the two connecting wires 200, positioning surfaces (not shown in figure) located in the installing channel 611 are arranged at both sides of the lamp holder 610, and two sides of the positioning block 710 are abutted against the positioning surfaces respectively. It should be noted that an upper end of the isolating column 310 is fixed with the light source body 100 and a lower end of the isolating column 310 is fixed with the positioning block 710 after hot melting and cooling, so that the light source body 100 is integrated with the positioning block 710. The positioning block 710 is installed in the installing channel 611 and is fixed under the actions of the positioning surfaces, so that the positioning block 710 is not easy to rotate or shake. In this way, the light source body 100 is fixed, and works more stably.

Figure 2:
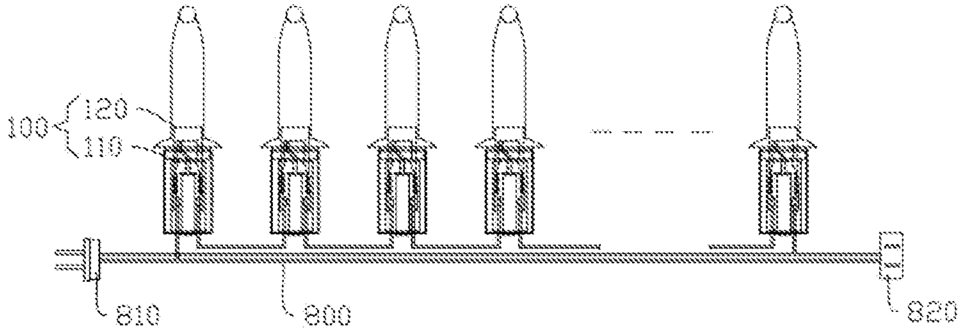
FIG. 2 is a structural schematic diagram of a lamp string in an embodiment of a second aspect of the disclosure.

Referring to FIG. 2, a lamp string according to an embodiment of a second aspect of the disclosure includes the water-proof decorative lamps according to the embodiment of the first aspect of the disclosure. As the lamp string includes all technical features of the water-proof decorative lamp in the embodiment of the disclosure, it also has the beneficial effects of all the foregoing embodiments, which are not repeated herein.

It should be understood that, referring to FIG. 2, the lamp string further includes a cable 800. The cable 800 is electrically connected with the connecting wire 200 and is provided with a power interface 810, and the power interface 810 is configured for connecting to a driving power. It should be noted that the decorative lamps may be connected via a cable in parallel or in series according to the need, so that the decorative lamps are disposed on a long object and are applicable to different occasions. During use, the power interface 810 is connected with the driving power to light up the decorative lamps connected to the cable 800. The cable 800 has a good water-proof performance, so a good water-proof performance can be achieved after the cable 800 is connected with the water-proof decorative lamps.

Those of ordinary skills in the art may understand that, with reference to FIG. 2, a connector 820 is arranged at the tail end of the cable 800, and the power interface 810 of the next lamp string may be connected with the connector 820 to achieve the effect of extending the length of the lamp string, making the connection between the lamp strings more convenient and improving the usage experiences of the users.

The embodiments of the disclosure are described in detail with reference to the drawings above, but the disclosure is not limited to the above embodiments, and various changes may also be made within the knowledge scope of those of ordinary skills in the art without departing from the purpose of the disclosure.

What is claimed is:

1. A water-proof decorative lamp, comprising:

a light source body, comprising a light-emitting chip and a packaging body, wherein the light-emitting chip is arranged in the packaging body and the light-emitting chip is provided with two pins extending out of the packaging body;

connecting wires, each comprising a conductive wire and an insulating layer, wherein a side wall of the conductive wire is covered with the insulating layer, the conductive wire located at one end of the connecting wire protrudes out of the insulating layer to form a connector, and the two pins are respectively connected with the connectors; and a water-proof component, comprising an isolating column and a sleeve, wherein the isolating column is disposed between the two pins so as to separate the two pins from each other and separate the two connectors from each other, one end of the sleeve is arranged around the insulating layer near the connector, and the other end of the sleeve is arranged around the packaging body near the pin, to cover the connector and the pin, the isolating column is made of a hot melting material, and the sleeve is made of a heat-shrinkable material;

wherein the water-proof decorative lamp further comprises a lamp holder and a light transmitting cover, the lamp holder is provided with an installing channel with an opening, the light source body is arranged in the installing channel, a notch for passing the connecting wire is arranged on a bottom wall of the installing channel, the light transmitting cover is snap-fitted with the lamp holder, and the light transmitting cover is configured for covering the installing channel;

wherein the water-proof decorative lamp further comprises a positioning block, the positioning block is arranged at a bottom portion of the isolating column and is located between the connecting wires, positioning surfaces located in the installing channel are arranged at both sides of the lamp holder, and two sides of the positioning block are abutted against the positioning surfaces respectively, and the bottom wall of the installing channel is located below the positioning block.

2. The water-proof decorative lamp according to claim 1, wherein the water-proof decorative lamp further comprises a conductive terminal, a first clip is arranged at one end of the conductive terminal, a second clip is arranged at the other end of the conductive terminal, the first clip is roll-pressed on the pin, and the second clip is roll-pressed on the connector.

3. The water-proof decorative lamp according to claim 1, wherein the conductive terminal is provided with a third clip, and the third clip is configured for roll-pressing on the insulating layer near the connector.

4. The water-proof decorative lamp according to claim 1, wherein the water-proof decorative lamp further comprises a resistor, the resistor is arranged between the pin and the connector, one end of the resistor is connected to the pin, and the other end of the resistor is connected to the connector.

5. The water-proof decorative lamp according to claim 1, wherein an umbrella-shaped shielding part is arranged at one end of the light transmitting cover near the lamp holder for covering a gap between the cover and the lamp holder.

6. A lamp string, comprising a plurality of the water-proof decorative lamps according to claim 1 and a cable, wherein the cable is electrically connected with the connecting wires and is provided with a power interface, and the power interface is configured for connecting to a driving power.

* * * * *